United States Patent
Niemi

(10) Patent No.: US 9,181,038 B1
(45) Date of Patent: Nov. 10, 2015

(54) BUCKET ELEVATOR ADJUSTABLE GUIDE SYSTEM

(71) Applicant: S-M Enterprises, Inc., Moorhead, MN (US)

(72) Inventor: Dale W. Niemi, Moorhead, MN (US)

(73) Assignee: S-M Enterprises, Inc., Moorhead, MN (US)

( * ) Notice: Subject to any disclaimer, the term of this patent is extended or adjusted under 35 U.S.C. 154(b) by 0 days.

(21) Appl. No.: 14/642,197

(22) Filed: Mar. 9, 2015

(51) Int. Cl.
*B65G 31/02* (2006.01)
*B65G 21/10* (2006.01)
*B65G 17/12* (2006.01)

(52) U.S. Cl.
CPC ............. *B65G 31/02* (2013.01); *B65G 17/126* (2013.01); *B65G 21/10* (2013.01); *B65G 2812/02237* (2013.01); *B65G 2812/02247* (2013.01)

(58) Field of Classification Search
CPC ...... B65G 17/126; B65G 17/36; B65G 21/08; B65G 21/10; B65G 31/00; B65G 31/02; B65G 2812/02237; B65G 2812/02247
See application file for complete search history.

(56) References Cited

U.S. PATENT DOCUMENTS

| 688,684 | A | | 12/1901 | Piez | |
|---|---|---|---|---|---|
| 697,716 | A | | 4/1902 | Hartzell | |
| 1,462,126 | A | * | 7/1923 | Ross | B65G 11/088 193/27 |
| 2,084,920 | A | * | 6/1937 | Schrag | B65G 47/00 198/569 |
| 2,557,325 | A | * | 6/1951 | Transeau | B65G 17/126 198/523 |
| 2,727,669 | A | | 12/1955 | Sackett | |
| 2,965,379 | A | | 12/1960 | Ganley | |
| 3,580,641 | A | | 5/1971 | Schloss, Jr. | |
| 3,695,224 | A | * | 10/1972 | Royka | G03G 15/0801 118/690 |
| 4,333,561 | A | | 6/1982 | Schlegel | |
| 4,875,889 | A | | 10/1989 | Hagerer | |
| 5,178,256 | A | | 1/1993 | Anderson | |
| 5,469,957 | A | * | 11/1995 | Seymour | B65G 17/126 198/711 |
| 6,419,093 | B2 | | 7/2002 | Boese | |
| 2011/0203247 | A1 | | 8/2011 | Berthet | |

* cited by examiner

*Primary Examiner* — Leslie A Nicholson, III
*Assistant Examiner* — Keith R Campbell
(74) *Attorney, Agent, or Firm* — Neustel Law Offices

(57) ABSTRACT

A bucket elevator adjustable guide system for efficiently dispensing grain from a bucket elevator with reduced grain dispersion. The bucket elevator adjustable guide system generally includes a head housing for a bucket elevator and a guide member attached to a lower portion of the head housing. The guide member is distally spaced from the head housing forming a lower vent and an upper vent between the exterior surface of the guide member and the head housing for air to pass through thereby preventing the accumulation of particulate material.

38 Claims, 10 Drawing Sheets

BUCKET ELEVATOR ADJUSTABLE GUIDE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a bucket elevator and more specifically it relates to a bucket elevator adjustable guide system for efficiently dispensing grain from a bucket elevator with reduced grain dispersion.

2. Description of the Related Art

Any discussion of the related art throughout the specification should in no way be considered as an admission that such related art is widely known or forms part of common general knowledge in the field.

Bucket elevators (a.k.a. bucket conveyors) are commonly utilized to elevate particulate material (e.g. grain). Conventional bucket elevators are comprised of a plurality of buckets attached to an elongated flexible structure (e.g. belt or chain) that passes over an upper pulley. At the lower portion of the elongated flexible structure on the downward extending run, the buckets collect the particulate material in the boot portion of the bucket elevator and then pass around the lower pulley of the bucket elevator and then continue to move upwardly along the upward run of the elongated flexible structure. A motor drives the lower pulley and therefore drives the elongated flexible structure with the buckets. At the upper pulley of the bucket elevator, the buckets dispense the particulate material which then exits through a discharge chute. Vertically orientated bucket elevators often times require centrifugal force to get the particulate material out of the buckets and into the discharge chute and often times referred to as "centrifugal discharge elevators". One of the problems with conventional bucket elevators is that the particulate material is released outwardly because of centrifugal force thereby engaging the ceiling resulting in dispersion of the particulate material thereby creating turbulence in the grain flow that can reduce the flow rate of the grain.

Because of the inherent problems with the related art, there is a need for a new and improved bucket elevator adjustable guide system for efficiently dispensing grain from a bucket elevator with reduced grain dispersion.

BRIEF SUMMARY OF THE INVENTION

The invention generally relates to a bucket elevator which includes a head housing for a bucket elevator and a guide member attached to a lower portion of the head housing. The guide member is distally spaced from the head housing forming a lower vent and an upper vent between the exterior surface of the guide member and the head housing for air to pass through thereby preventing the accumulation of particulate material.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
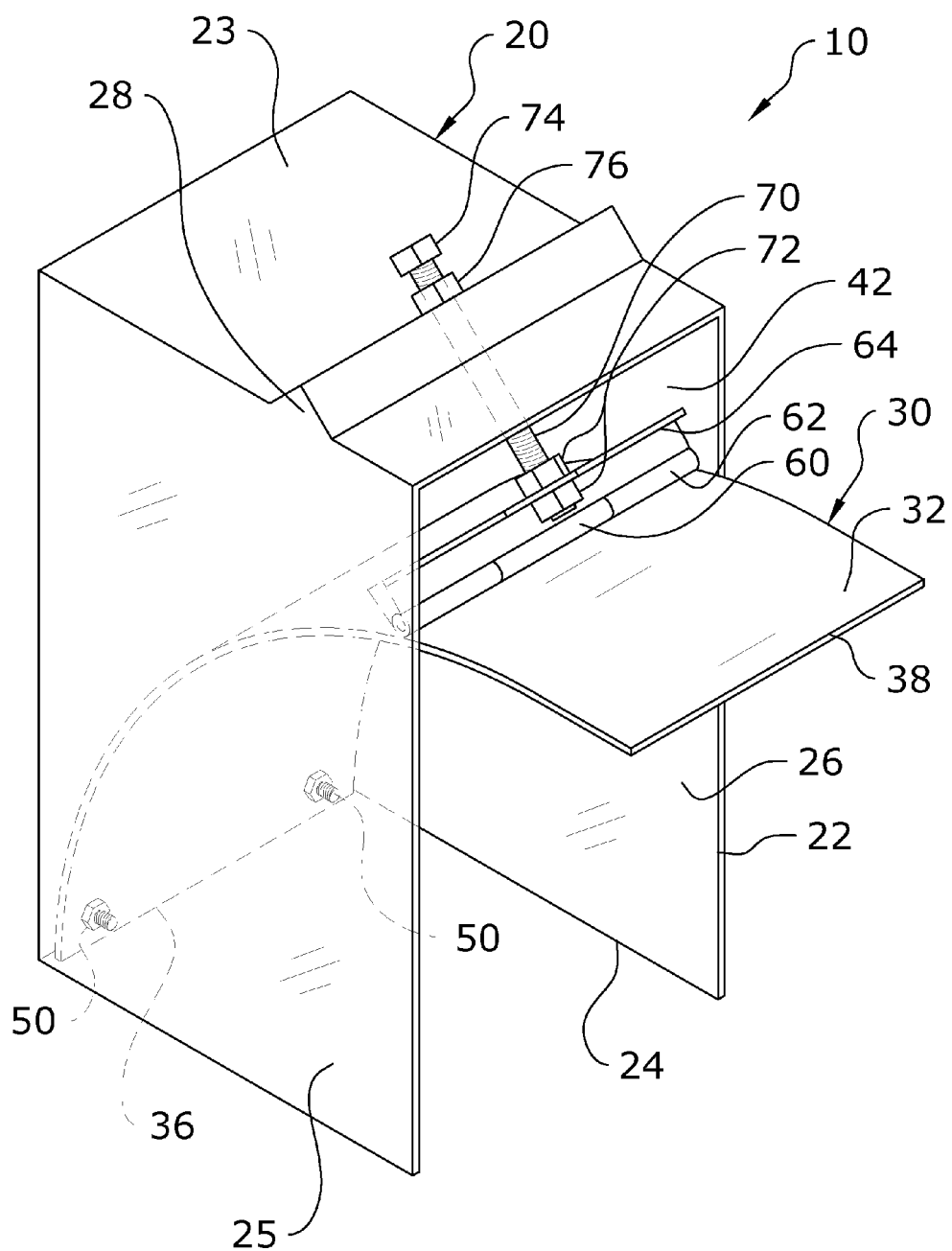
FIG. 1 is an upper perspective view of the present invention.

A. Overview.

Turning now descriptively to the drawings, in which similar reference characters denote similar elements throughout the several views, FIGS. 1 through 10 illustrate a bucket elevator adjustable guide system 10, which comprises a head housing 20 for a bucket elevator 12 and a guide member 30 attached to a lower portion of the head housing 20. The guide member 30 is distally spaced from the head housing 20 forming a lower vent 40 and an upper vent 42 between the exterior surface 32 of the guide member 30 and the head housing 20 for air to pass through thereby preventing the accumulation of particulate material 11. The terms bucket elevator 12 and bucket conveyor 12 are utilized interchangeably herein.

B. Bucket Elevator.

The bucket elevator 12 may be comprised of any conventional bucket elevator 12 or bucket conveyor 12 adapted for moving volumes of particulate material 11. The present invention is preferably utilized with a centrifugal discharge elevator, but may also be utilized with various other types of bucket elevators 12. The present invention is further preferably utilized with a bucket elevator 12 designed for use in moving grain as the particulate material 11, but may also be utilized with various other types of bucket elevators 12 that move non-grain particulate material 11. U.S. Pat. No. 1,944,932 to Gemeny illustrates an exemplary elevator bucket and is incorporated by reference herein.

Figure 10:
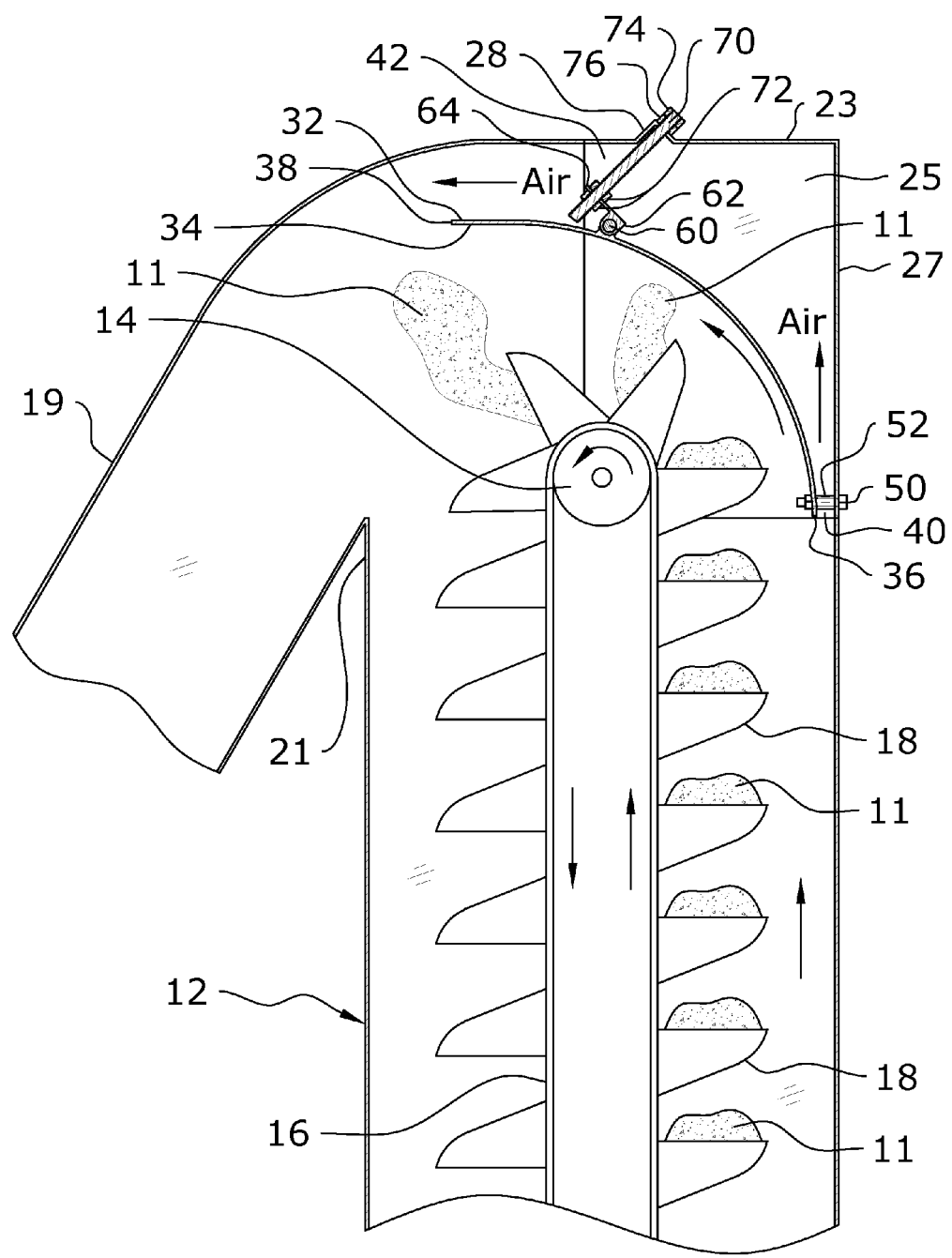
FIG. 10 is a side cutaway view of the present invention utilized within a bucket elevator showing the particulate material.

A conventional bucket conveyor 12 is typically comprised of a boot at the lower end for receiving the particulate material 11 and a head housing 20 (sometimes referred to as a "hood") with a discharge opening 22 for discharging the particulate material 11. The conventional bucket conveyor 12 further includes an upper pulley 14 at the upper end within the head housing 20 and a lower pulley at the lower end within the boot. The elongated flexible structure 16 (e.g. belt, chain) extends over the upper pulley 14 and the lower pulley. Either the upper pulley 14 or the lower pulley is driven by a motor to move the elongated flexible structure 16 thereby forming an upward moving run and a downward moving run. FIG. 10 of the drawings shows an upward moving run and a downward moving run of the elongated flexible structure 16. A plurality of buckets 18 are attached to the elongated flexible member and extend outwardly as further shown in FIG. 10 of the drawings. As each of the buckets 18 gets to the top of the upward moving run, the particulate material 11 within the bucket is discharged from the bucket due to centrifugal force as further shown in FIG. 10 of the drawings. The elongated flexible member and the buckets 18 move upwardly and downwardly within one or more enclosed tubular legs of the bucket conveyor 12.

C. Head Housing of Bucket Elevator.

FIGS. 1 through 10 illustrate an exemplary head housing 20 for a bucket elevator 12. It can be appreciated that the head housing 20 may have different shapes, structures and configurations. As shown in FIGS. 1 through 10 of the drawings, the head housing 20 has a back wall with a first sidewall 25 and a second sidewall 26 attached on opposing sides of the back wall.

Figure 8:
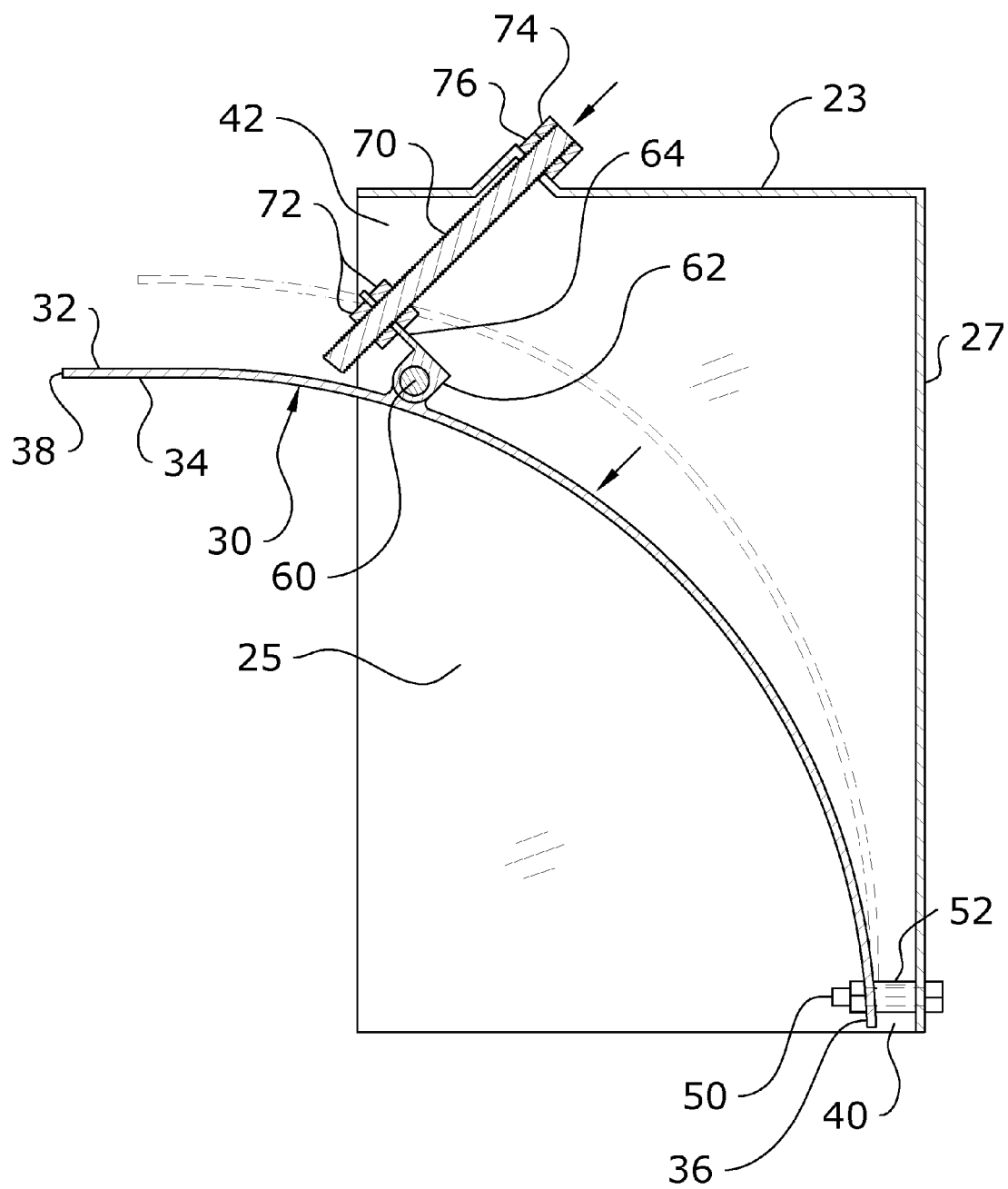
FIG. 8 is a cross sectional view taken along line 8-8 of FIG. 4 illustrating the adjustable guide being moved at a downward angle.
Figure 9:
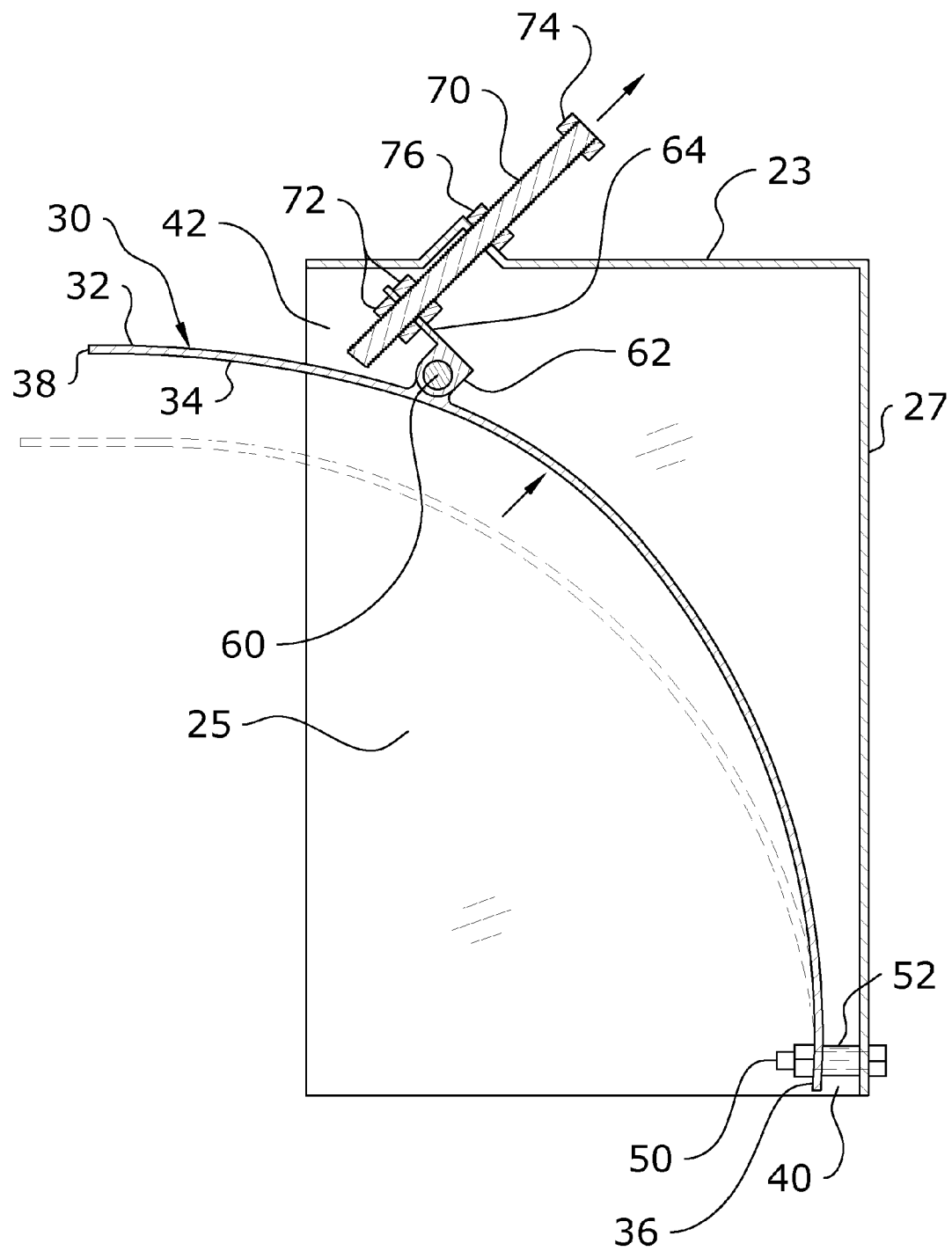
FIG. 9 is a cross sectional view taken along line 8-8 of FIG. 4 illustrating the adjustable guide being moved at an upward angle.

The back wall may be comprised of a single unitary structure such as a flat sheet of metal or multiple sheets of metal connected together. FIGS. 8 through 10 best illustrate the back wall being comprised of a rear wall 27 extending upwardly in a vertical manner and a ceiling 23 extending forwardly from the upper end of the rear wall 27 in a generally horizontal manner. The back wall may be comprised of a curved configuration or an angled configuration.

The first sidewall 25, the second sidewall 26 and the rear wall 27 form a lower opening 24 that is connected to the upper end of the leg of the bucket conveyor 12. The first sidewall 25, the second sidewall 26 and the ceiling 23 form the discharge opening 22 that the particulate material 11 is discharged through. A discharge chute 19 is connected to the head housing 20 about the discharge opening 22 to receive the discharged particulate material 11 to transfer to a different location such as another conveyor or a storage location. The head housing 20 also includes a front wall 21 that is positioned opposite of the rear wall 27 and is below the discharge opening 22.

D. Guide Member.

The guide member 30 is utilized to guide the particulate material 11 which requires an operator to adjust for various types of conditions including, but not limited to, the type of particulate material 11, the flow rate of particulate material 11, temperature and possibly humidity. The guide member 30 is attached to the interior of the head housing 20 and is positioned within the interior of the head housing 20 as illustrated in FIGS. 3 and 8 through 10 of the drawings.

The guide member 30 is preferably connected to the head housing 20 in an adjustable and movable manner to allow for adjustment to various particulate material 11 conditions. However, the guide member 30 may be non-movably connected to the head housing 20 in a non-adjustable manner where the guide member 30 is set in a desired position at the factory or the by end user.

The guide member 30 is preferably attached to the back wall (the rear wall 27 or the ceiling 23) of the head housing 20, but may be attached to the sidewalls 25, 26. In the preferred embodiment, the guide member 30 is attached to the rear wall 27 as best illustrated in FIGS. 2 and 8 through 10 of the drawings.

The guide member 30 has an interior surface 34 that the particulate material 11 engages and an exterior surface 32 opposite of the interior surface 34 as best illustrated in FIGS. 8 through 10 of the drawings. The guide member 30 also has a first end portion 36 and a second end portion 38 opposite of the first end portion 36.

The first end portion 36 of the guide member 30 is attached to the lower portion of the head housing 20 (e.g. to the lower portion of the rear wall 27 or the sidewalls 25, 26). The first end portion 36 of the guide member 30 is preferably vertically orientated and the second end portion 38 is preferably horizontally orientated. It can be appreciated that the shape of the guide member 30 along with the length and application will determine the exact orientation of the different portions of the guide member 30.

The first end portion 36 is distally spaced from the head housing 20 forming a lower vent 40 between the exterior surface 32 of the guide member 30 and the head housing 20. The second end portion 38 is distally spaced from the head housing 20 forming an upper vent 42 between the exterior surface 32 of the guide member 30 and the head housing 20. The lower vent 40 and the upper vent 42 are fluidly connected to one another to allow for air to pass through. The lower vent 40 receives air moving upwardly with the upward moving run of the bucket elevator 12 as illustrated in FIG. 10 of the drawings. The air moves from the lower vent 40 to between the guide member 30 and the head housing 20 and then out through the upper vent 42 as further shown in FIG. 10 of the drawings.

The guide member 30 is comprised of a plate such as, but not limited to, a flat piece of material (e.g. sheet metal). The guide member 30 is preferably curved as illustrated in FIG. 8 through 10 of the drawings. The radius of curvature for the guide member 30 may be constant or varying. The second end portion 38 of the guide member 30 preferably extends over the top end of the bucket conveyor 12 and partially through the discharge opening 22 as illustrated in FIG. 10.

Figure 2:
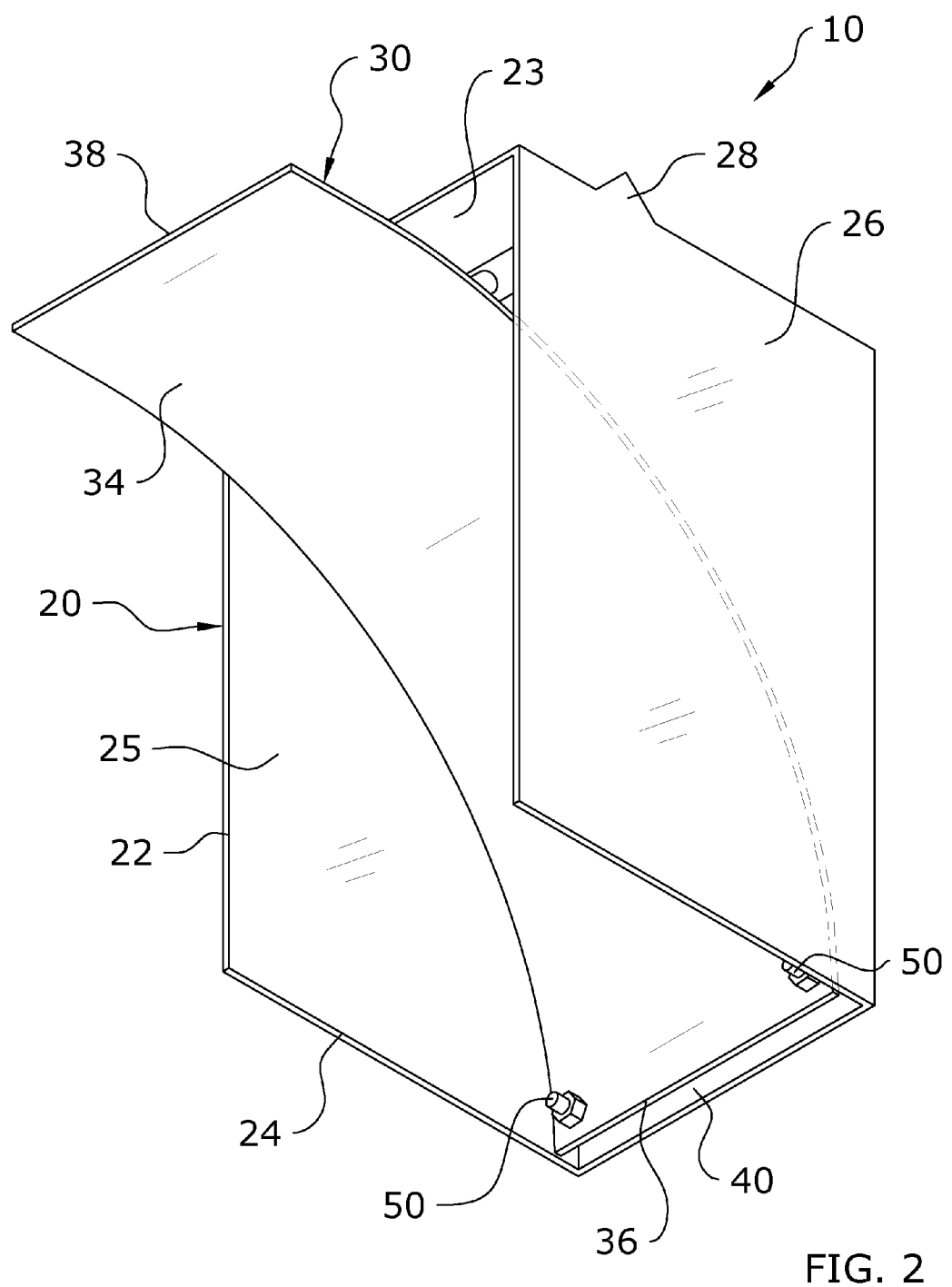
FIG. 2 is a lower perspective view of the present invention.
Figure 3:
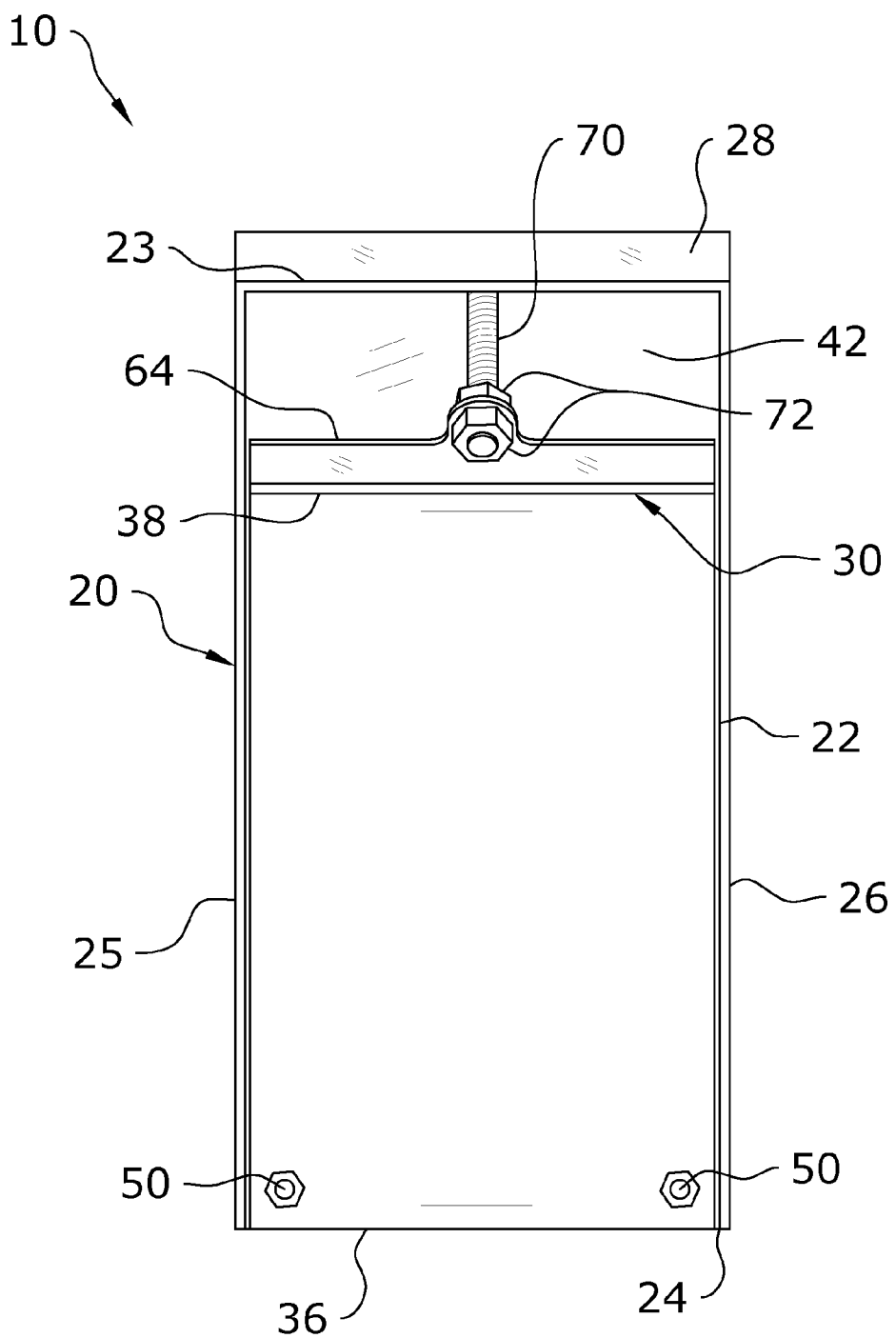
FIG. 3 is a front view of the present invention.
Figure 4:
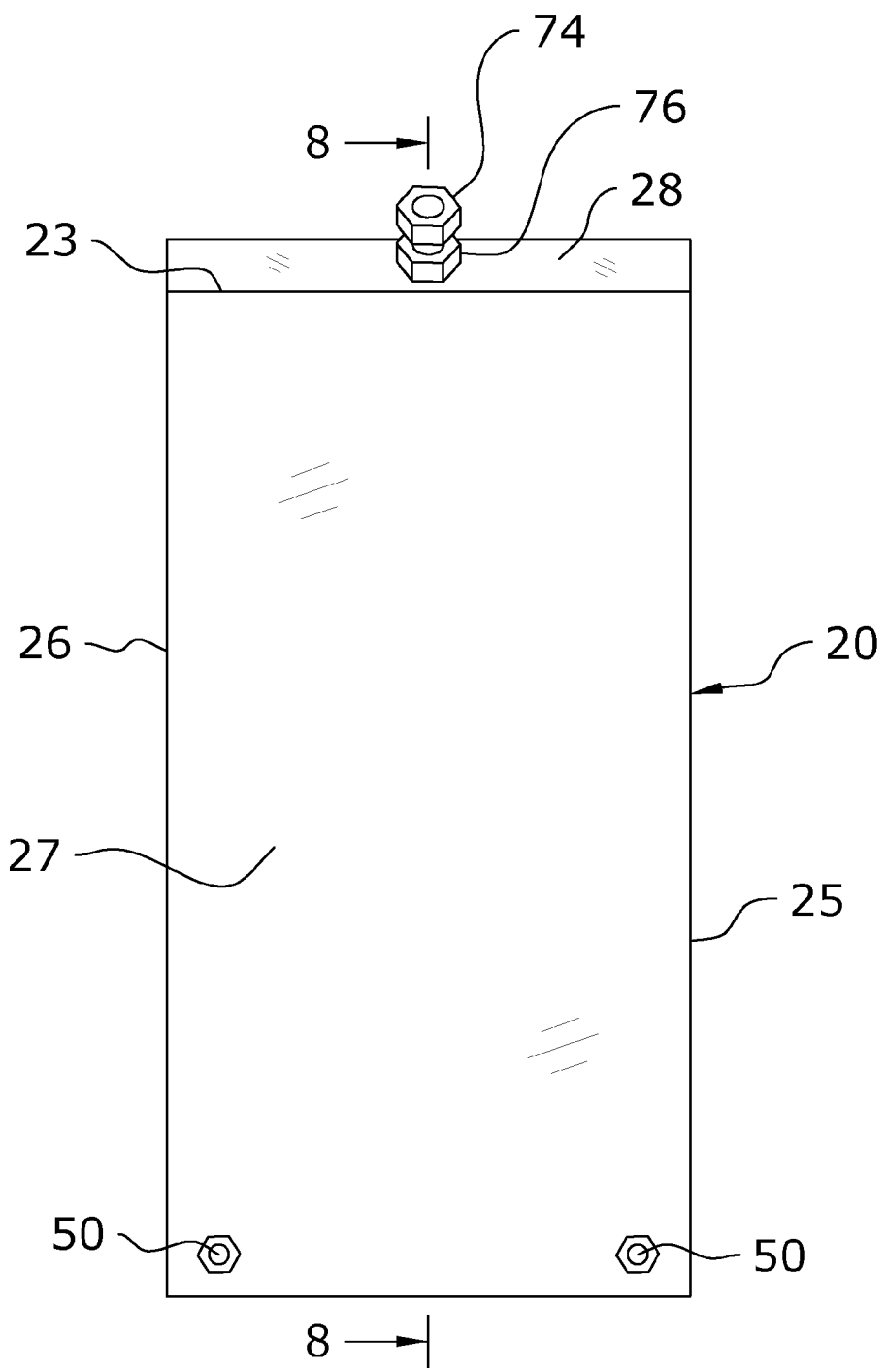
FIG. 4 is a rear view of the present invention.
Figure 5:
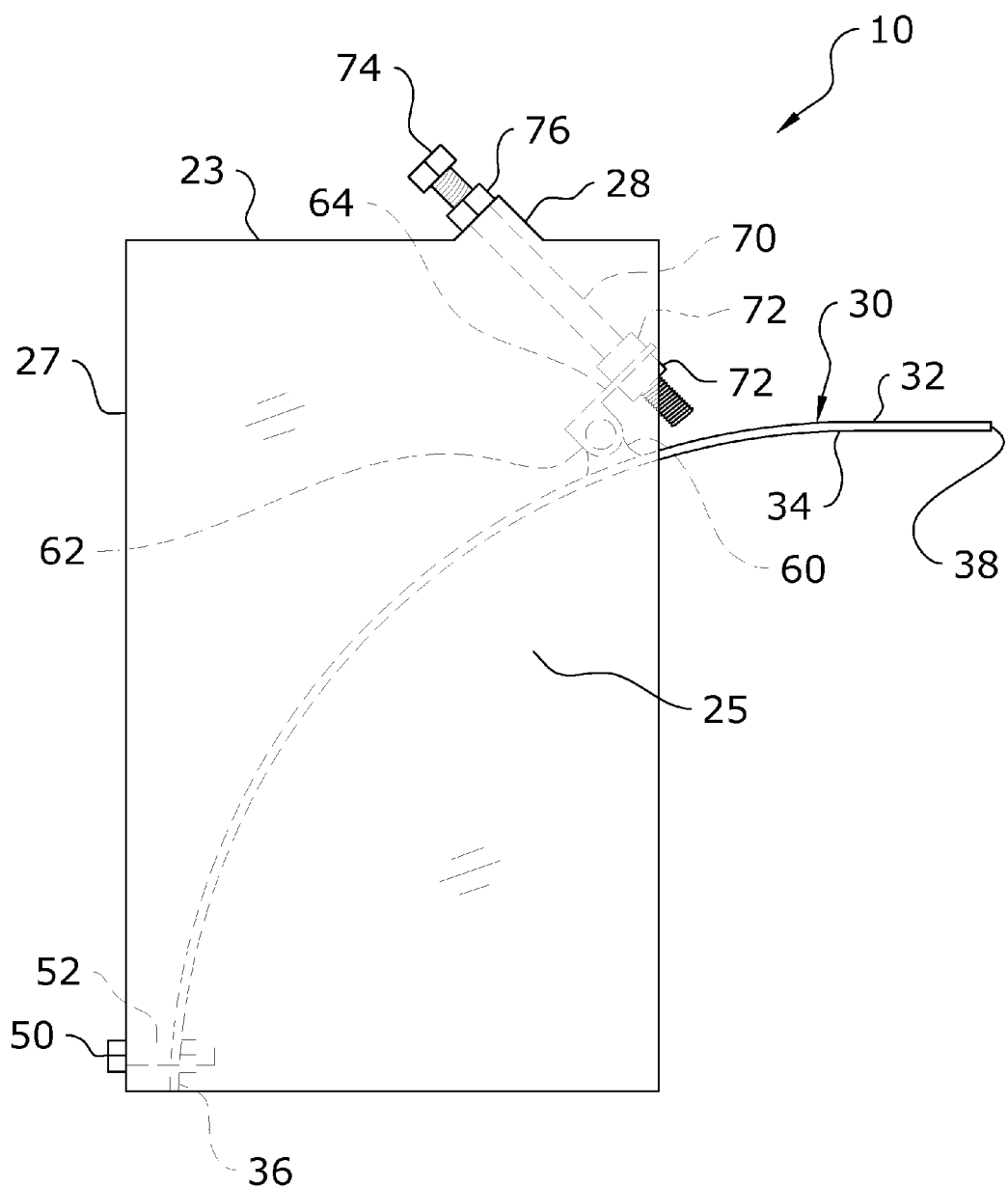
FIG. 5 is a right side view of the present invention.
Figure 6:
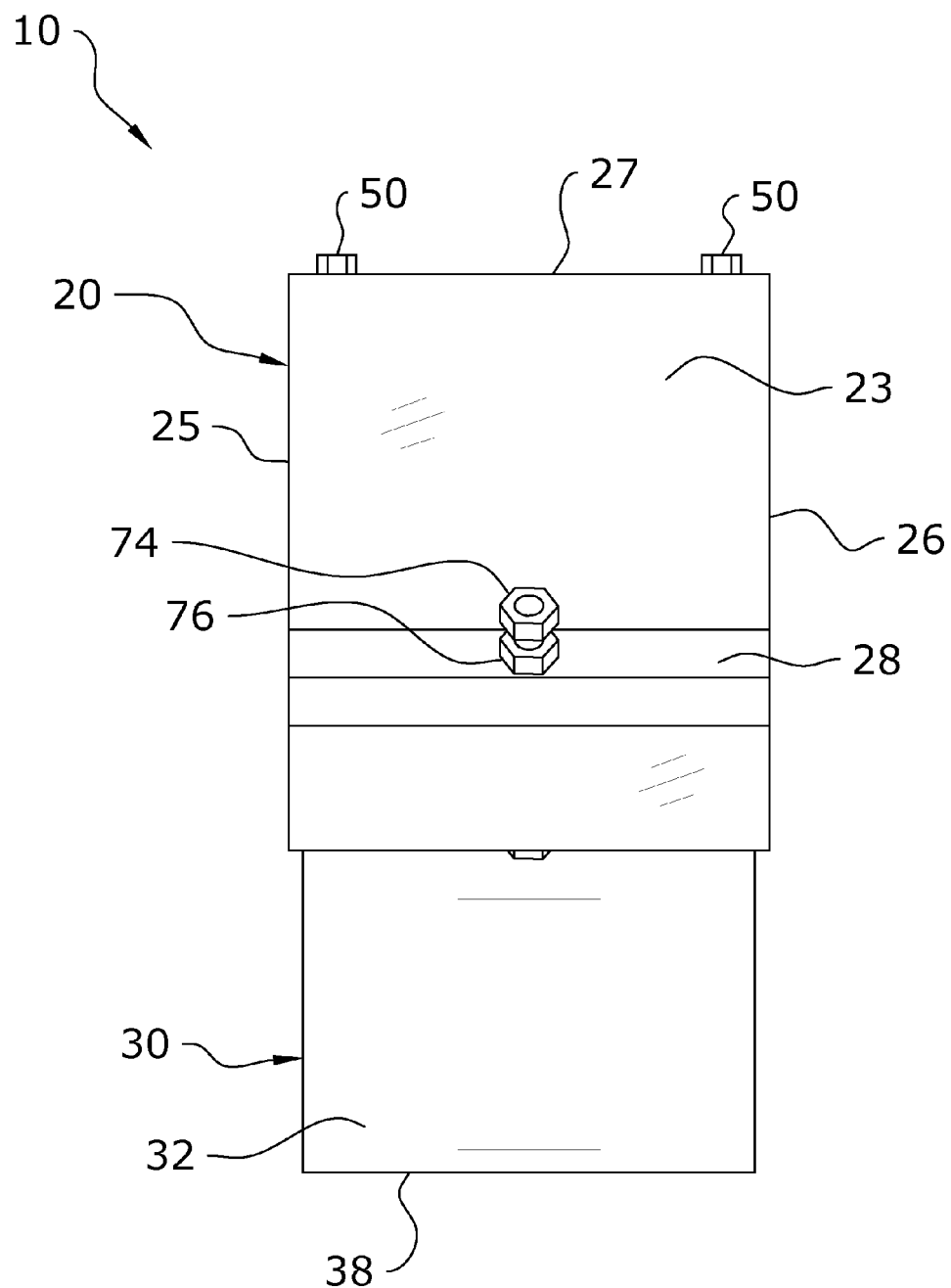
FIG. 6 is a top view of the present invention.
Figure 7:
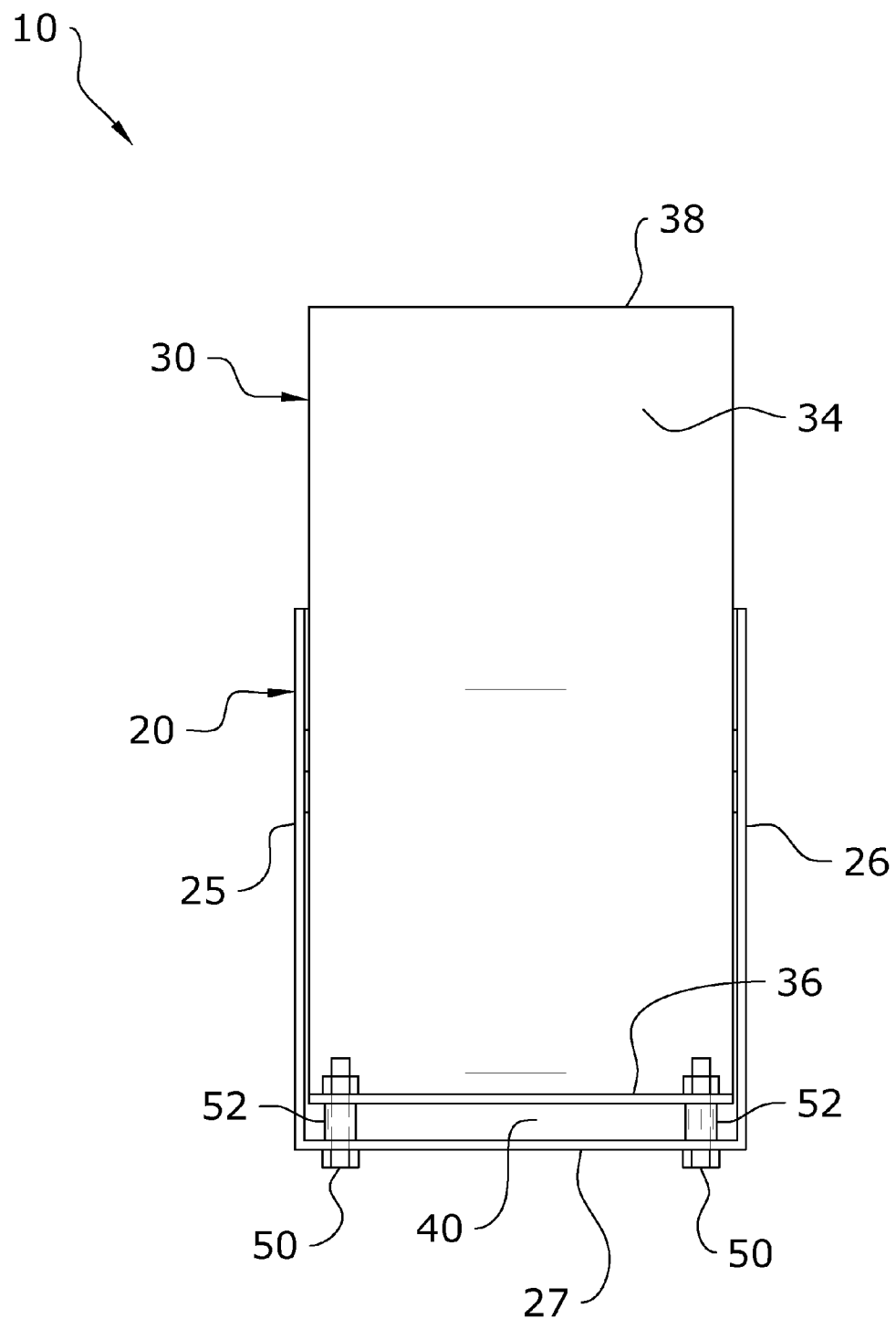
FIG. 7 is a bottom view of the present invention.

As shown in FIGS. 2, 3, 4 and 8 through 10 of the drawings, at least one fastener 50 extends from rear wall 27 of the head housing 20 to the first end portion 36 of the guide member 30. It is preferable to utilize at least two fasteners 50 positioned near opposing sides of the guide member 30 as best illustrated in FIG. 2. The fasteners 50 are preferably comprised of a threaded shaft (e.g. a threaded bolt with a threaded nut attached to the bolt), but a non-threaded shaft may also be utilized (e.g. a welded shaft connecting the first end portion 36 of the guide member 30 to the rear wall 27 of the head housing 20). A spacer 52 is positioned upon the fasteners 50, preferably positioned between the head housing 20 and the guide member 30, to maintain the desired spacing that forms the lower vent 40. The spacer 52 may be removed and replaced with different sizes of spacers 52 depending upon the size of the lower vent 40 desired for the head housing 20.

E. Adjustment Member.

The head housing 20 is preferably attached to both the rear wall 27 and the ceiling 23 of the head housing 20 to provide sufficient support and limited moving during operation of the bucket conveyor 12. An adjustment member 70 is connected to the head housing 20 and the guide member 30 as illustrated in FIGS. 8 through 10 of the drawings. The adjustment member 70 adjusts a position of the guide member 30 with respect to the head housing 20 depending upon the desired flow rate of the particulate material 11 and other factors. The adjustment member 70 allows the user to manually (or possibly automatically) reposition the guide member 30 so that an upper portion of the guide member 30 is either closer to or further away from the buckets 18 at the top of the bucket conveyor 12 as illustrated in FIGS. 8 and 9 of the drawings. The adjustment of the position of the guide member 30 also adjusts the size of the upper vent 42.

The adjustment member 70 is preferably pivotally attached to the guide member 30 by a hinge 60 to prevent binding when adjusting the position of the guide member 30. The hinge 60 is comprised of a first member 62 that extends upwardly and rearwardly from an exterior surface 32 of the guide member 30. The first member 62 is further pivotally connected to the guide member 30 via a pin or other pivoting structure. A second member 64 extends at an angle from the first member 62 and preferably extends upwardly and forwardly from the upper end of the first member 62 as shown in FIGS. 8 through 10 of the drawings.

The adjustment member 70 is connected to the second member 64 as shown in FIGS. 1 and 8 through 10 of the drawings. The adjustment member 70 rotatably extends through an aperture within the second member 64 thereby allowing for rotation of the adjustment member 70 by a user. A pair of lower retaining members 72 positioned on opposing sides of the second member 64 retain the adjustment member 70 upon the second member 64 while allowing for rotation of the adjustment member 70. The adjustment member 70 further preferably extends outside of the head housing 20 for manual engagement by the operator as further illustrated in FIGS. 1 and 8 through 10 of the drawings.

The adjustment member 70 is preferably comprised of a threaded shaft that is threadably connected to the head housing 20. The head housing 20 may be constructed to have a threaded opening that the adjustment threadably passes through, or an interiorly threaded member 76 (e.g. a threaded nut welded to the head housing 20) may be attached to the head housing 20 that the adjustment member 70 threadably passes through as shown in FIGS. 1 and 8 through 10 of the drawings. The adjustment member 70 further includes an engaging head 74 which may be hexagonal or otherwise shaped to be engaged by a tool such as a socket or wrench. Hence, when the adjustment member 70 is rotated in a first direction (e.g. clockwise), the adjustment member 70 extends into the interior of the head housing 20 thereby forcing the guide member 30 downwardly and inwardly at an angle also as shown in FIG. 8 of the drawings. In addition, when the adjustment member 70 is rotated in a second direction (e.g. counterclockwise) opposite of the first direction, the adjustment member 70 extends away from the interior of the head housing 20 thereby pulling the guide member 30 upwardly and outwardly at an angle also as shown in FIG. 9 of the drawings. As the guide member 30 is moved by the adjustment member 70, the hinge 60 pivots to prevent binding of the adjustment member 70 with respect to the guide member 30. It should be noted that the movement of the guide member 30 at the second end portion 38 is neither solely horizontal nor vertical since the first end portion 36 is attached to the head housing 20 resulting in a broad arc of movement having a large radius.

The adjustment member 70 extends downwardly through the ceiling 23 of the head housing 20 at an angle extending away from the rear wall 27 and also extending towards the discharge opening 22 of the head housing 20 as shown in FIGS. 8 through 10 of the drawings. The angle of the adjustment member 70 is preferably approximately aligned with the arc of movement as best illustrated in FIG. 8 through 10 of the drawings. The ceiling 23 of the head housing 20 further preferably includes an extended portion 28 that extends upwardly having a forward facing wall and a rear facing wall, wherein the adjustment member 70 extends through the rear facing wall substantially transverse to the rear facing wall as shown in FIGS. 8 through 10 of the drawings.

F. Operation of Preferred Embodiment.

In use, the head housing 20 is attached to the bucket conveyor 12 and the discharge chute 19 is attached to the head housing 20 as shown in FIG. 10. The operator then runs the bucket conveyor 12 with the particulate material 11 monitoring the discharge characteristics of the particulate material 11 and the flow rate of the particulate material 11. The operator adjusts the adjustment member 70 to correspondingly adjust the position of the guide member 30 within the head housing 20. After each adjustment, the operator monitors the discharge characteristics and the flow rate of the particulate material 11. The operator continues to adjust the position of the guide member 30 until a desired discharge characteristic and maximum flow rate is achieved for the particulate material 11. In operation, the buckets 18 move upwardly along the upward moving run of the elongated flexible structure 16 thereby creating an upward air movement within the leg of the bucket elevator 12. The upward moving air in the leg of the bucket elevator 12 passes through the lower vent 40 around the guide member 30 along the exterior surface 32 and then through the upper vent 42. The air moving through the lower vent 40 and the upper vent 42 allows for decreased dispersion of the particulate material 11 at the location of discharge by providing a natural air flow around the particulate material 11. The air moving through the lower vent 40 and the upper vent 42 also prevents the accumulation of particulate material 11, dust and other material. Over time, the operator may come back and do additional adjustments to the guide member 30 based upon various factors.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A head housing system for a bucket elevator, comprising:
   a head housing for a bucket elevator; and
   a guide member having an interior surface, an exterior surface opposite of said interior surface, a first end portion and a second end portion, wherein said first end portion is attached to a lower portion of said head housing, and wherein said first end portion is distally spaced from said head housing forming a lower vent between said exterior surface of said guide member and said head housing;
   at least one fastener extending from said head housing to said first end portion of said guide member;
   a spacer positioned between said head housing and said guide member.

2. The head housing system of claim 1, wherein said head housing includes a back wall, and wherein said guide member is attached to said back wall of said head housing.

3. The head housing system of claim 2, wherein said back wall of said head housing is comprised of a rear wall and a ceiling, wherein said guide member is attached to said rear wall.

4. The head housing system of claim 3, wherein said guide member is attached to said ceiling of said head housing.

5. The head housing system of claim 3, wherein said rear wall is vertically orientated and wherein said ceiling is horizontally orientated.

6. The head housing system of claim 1, wherein said guide member is curved.

7. The head housing system of claim 6, wherein said first end portion is vertically orientated and wherein said second end portion is horizontally orientated.

8. The head housing system of claim 6, wherein said guide member is comprised of a plate.

9. The head housing system of claim 8, wherein said guide member is comprised of a flat piece of metal.

10. The head housing system of claim 1, wherein said at least one fastener is comprised of at least two fasteners positioned near opposing sides of said guide member.

11. The head housing system of claim 1, wherein said at least one fastener is comprised of a threaded shaft.

12. The head housing system of claim 1, wherein said second end portion is distally spaced from said head housing forming an upper vent between said exterior surface of said guide member and said head housing, wherein said lower vent and said upper vent are fluidly connected.

13. The head housing system of claim 1, including an adjustment member connected to said head housing and said guide member, wherein said adjustment member adjusts a position of said guide member with respect to said head housing.

14. The head housing of system claim 13, wherein said adjustment member is pivotally attached to said guide member by a hinge.

15. The head housing system of claim 14, wherein said hinge is comprised of a first member pivotally connected to said guide member and a second member extending at an angle from said first member, wherein said adjustment member is connected to said second member.

16. The head housing system of claim 15, wherein said adjustment member rotatably extends through said second member.

17. The head housing system of claim 13, wherein said adjustment member is comprised of a threaded shaft that is threadably connected to said head housing.

18. The head housing system of claim 13, wherein said adjustment member extends downwardly at an angle away from a rear wall of said head housing and towards a discharge opening of said head housing.

19. A head housing system for a bucket elevator, comprising:
   a head housing for a bucket elevator; and
   a guide member having an interior surface, an exterior surface opposite of said interior surface, a first end portion and a second end portion, wherein said first end portion is attached to a lower portion of said head housing, and wherein said first end portion is distally spaced from said head housing forming a lower vent between said exterior surface of said guide member and said head housing;
   wherein said head housing includes a back wall, and wherein said guide member is attached to said back wall of said head housing;
   wherein said back wall of said head housing is comprised of a rear wall and a ceiling, wherein said guide member is attached to said rear wall;
   wherein said guide member is attached to said ceiling of said head housing.

20. The head housing system of claim 19, wherein said rear wall is vertically orientated and wherein said ceiling is horizontally orientated.

21. A head housing system for a bucket elevator, comprising:
   a head housing for a bucket elevator; and
   a guide member having an interior surface, an exterior surface opposite of said interior surface, a first end portion and a second end portion, wherein said first end portion is attached to a lower portion of said head housing, and wherein said first end portion is distally spaced from said head housing forming a lower vent between said exterior surface of said guide member and said head housing;
   wherein said guide member is curved;
   wherein said first end portion is vertically orientated and wherein said second end portion is horizontally orientated.

22. The head housing system of claim 21, wherein said guide member is comprised of a plate.

23. The head housing system of claim 22, wherein said guide member is comprised of a flat piece of metal.

24. The head housing system of claim 21, wherein said first end portion is vertical and said second end portion is horizontal.

25. A head housing system for a bucket elevator, comprising:
   a head housing for a bucket elevator;
   a guide member having an interior surface, an exterior surface opposite of said interior surface, a first end portion and a second end portion, wherein said first end portion is attached to a lower portion of said head housing, and wherein said first end portion is distally spaced from said head housing forming a lower vent between said exterior surface of said guide member and said head housing; and
   an adjustment member connected to said head housing and said guide member, wherein said adjustment member adjusts a position of said guide member with respect to said head housing;
   wherein said adjustment member is pivotally attached to said guide member by a hinge.

26. The head housing system of claim 25, wherein said hinge is comprised of a first member pivotally connected to said guide member and a second member extending at an angle from said first member, wherein said adjustment member is connected to said second member.

27. The head housing system of claim 26, wherein said adjustment member rotatably extends through said second member.

28. The head housing system of claim 25, wherein said adjustment member is comprised of a threaded shaft that is threadably connected to said head housing.

29. The head housing system of claim 25, wherein said adjustment member extends downwardly at an angle away from a rear wall of said head housing and towards a discharge opening of said head housing.

30. The head housing system of claim 25, including at least one fastener extending from said head housing to said first end portion of said guide member.

31. The head housing system of claim 30, including a spacer positioned between said head housing and said guide member.

32. The head housing system of claim 25, wherein said head housing includes a back wall, and wherein said guide member is attached to said back wall of said head housing.

33. The head housing system of claim 32, wherein said back wall of said head housing is comprised of a rear wall and a ceiling, wherein said guide member is attached to said rear wall.

34. The head housing system of claim 33, wherein said guide member is attached to said ceiling of said head housing.

35. The head housing system of claim 33, wherein said rear wall is vertically orientated and wherein said ceiling is horizontally orientated.

36. The head housing system of claim 25, wherein said guide member is curved.

37. The head housing system of claim 25, wherein said first end portion is vertically orientated and wherein said second end portion is horizontally orientated.

38. The head housing system of claim 25, wherein said guide member is comprised of a plate.

\* \* \* \* \*